(12) United States Patent
Ryon et al.

(10) Patent No.: US 11,035,296 B2
(45) Date of Patent: Jun. 15, 2021

(54) INTERNAL MANIFOLD FOR MULTIPOINT INJECTION

(71) Applicant: Delavan Inc., West Des Moines, IA (US)

(72) Inventors: Jason A. Ryon, Carlisle, IA (US); Lev Alexander Prociw, Johnston, IA (US); Gregory A. Zink, Des Moines, IA (US); Joseph Samo, Johnston, IA (US)

(73) Assignee: Delavan Inc., West De Moines, IA (US)

( * ) Notice: Subject to any disclaimer, the term of this patent is extended or adjusted under 35 U.S.C. 154(b) by 65 days.

(21) Appl. No.: 16/031,724

(22) Filed: Jul. 10, 2018

(65) Prior Publication Data

US 2020/0018238 A1    Jan. 16, 2020

(51) Int. Cl.
  *F02C 7/22* (2006.01)
  *F23R 3/60* (2006.01)
  (Continued)

(52) U.S. Cl.
  CPC .............. *F02C 7/222* (2013.01); *F02C 7/228* (2013.01); *F23R 3/10* (2013.01); *F23R 3/28* (2013.01);
  (Continued)

(58) Field of Classification Search
  CPC .... F23R 3/28; F23R 3/283; F23R 3/60; F23R 3/286; F23R 3/14; F02C 7/22; F02C 7/222; F02C 7/228
  See application file for complete search history.

(56) References Cited

U.S. PATENT DOCUMENTS

| 2,970,438 A | 2/1961 | Howald |
| 3,720,058 A | 3/1973 | Collinson |

(Continued)

FOREIGN PATENT DOCUMENTS

| EP | 2589877 A2 | 5/2013 |
| EP | 3128239 A2 | 2/2017 |

(Continued)

OTHER PUBLICATIONS

Extended European Search Report dated Dec. 20, 2019, issued during the prosecution of European Patent Application No. EP 19185461.1.

*Primary Examiner* — Todd E Manahan
*Assistant Examiner* — Thuyhang N Nguyen
(74) *Attorney, Agent, or Firm* — Locke Lord LLP; Joshua L. Jones; Scott D. Wofsy (57) ABSTRACT

A multipoint injection system includes a manifold with a plurality of flow passages defined through the manifold in the circumferential direction. The flow passages are spaced apart from one another in an axial direction. A plurality of feed arms extends radially inward from the manifold. Feed arm portions of the flow passages extend through each of the feed arms to respective outlets. The feed arm portions of the flow passages are within the axial width of the manifold. A plurality of injection nozzles are included, each in fluid communication with a respective one of the outlets. Each injection nozzle includes an air passage therethrough with an air inlet. The feed arms each follow a path that is circumferentially offset from the air inlets so each of the feed arms is clear from a flow path directly upstream in the axial direction of each of the air inlets.

18 Claims, 8 Drawing Sheets

(51) Int. Cl.
*F02C 7/228* (2006.01)
*F23R 3/10* (2006.01)
*F23R 3/28* (2006.01)

(52) U.S. Cl.
CPC .......... *F23R 3/60* (2013.01); *F05B 2220/302* (2013.01); *F05B 2240/40* (2013.01)

(56) References Cited

U.S. PATENT DOCUMENTS

| 9,644,844 | B2* | 5/2017 | Prociw | F02C 7/222 |
| 2017/0037783 | A1* | 2/2017 | Ryon | F23R 3/346 |
| 2019/0234310 | A1* | 8/2019 | Morenko | F02C 7/222 |

FOREIGN PATENT DOCUMENTS

| EP | 3553382 A1 | 10/2019 |
| EP | 3553383 A1 | 10/2019 |

* cited by examiner

FIG. 10

INTERNAL MANIFOLD FOR MULTIPOINT INJECTION

BACKGROUND OF THE INVENTION

1. Field of the Invention

The present disclosure relates to combustion, and more particularly to multipoint injection systems such as used for combustion in gas turbine engines.

2. Description of Related Art

Multipoint fuel injection systems would benefit from a simple, low cost fuel injector and manifold construction to permit a large number of injectors to be used. Traditional fuel injector and nozzle designs require complex manifolding that can impede air flow from a compressor to the combustor in a gas turbine engine.

Such conventional methods and systems have generally been considered satisfactory for their intended purpose. However, there is still a need in the art for improved multipoint combustion systems. The present disclosure provides a solution for this need.

SUMMARY OF THE INVENTION

A multipoint injection system includes a manifold extending in a circumferential direction wherein a plurality of flow passages each having a main portion defined through the manifold in the circumferential direction. The flow passages are in fluid isolation from one another and are spaced apart from one another in an axial direction along an axial width extending from first axial end, e.g., on a compressor side, of the manifold to a second axial end, e.g. on a combustor side, of the manifold. A plurality of feed arms extends radially inward from the manifold, wherein feed arm portions of the flow passages extend through each of the feed arms, wherein the feed arm portions of the flow passages are within the axial width of the manifold.

An inner ring is supported from a radially inward end of the feed arms. The manifold and the inner ring each include bayonet flanges extending in an axial direction away from the compressor side of the manifold. A plurality of injection nozzles is included, wherein each of the feed arm portions of the flow passages includes a respective outlet opening in an axial direction toward the combustor side of the manifold with a respective one of the injection nozzles in fluid communication with each of the outlets. The outlets are within the axial width of the manifold. A combustor dome is mounted together with the manifold with the injection nozzles extending though the combustor dome. An outer combustor wall is mounted to the manifold. An inner combustor wall is included radially inward from the outer combustor wall. The inner combustor wall is mounted to an inner ring supported from radially inward ends of the feed arms. The combustor dome, injection nozzles, inner combustor wall, and outer combustor wall form an enclosure in which a majority of air passing from a compressor side of the combustor dome must pass through the injection nozzles to reach a combustor space defined radially between the inner and outer combustor walls.

At least one mounting flange extends radially outward from the manifold for supporting the manifold in an engine case. The at least one mounting flange includes at least one mounting flange with supply passages defined therethrough, one of the supply passages being in fluid communication with a respective one of the flow passages of the manifold. The manifold forms a complete ring, with the flow passages each forming a complete ring. The manifold forms a segment of a complete ring configured to form a complete ring with at least one additional manifold.

A first one of the flow passages of the manifold is axially closest of the flow passages to the compressor side of the manifold and is in fluid communication with a first one of the feed arm portions that is axially closest of the feed arm portions to the compressor side of the manifold. A second one of the flow passages of the manifold is axially adjacent to the first one of the flow passages and is in fluid communication with a second one of the feed arm portions that is axially adjacent to the first one of the feed arm portions. A third one of the flow passages of the manifold is axially adjacent to the second one of the flow passages and is in fluid communication with a third one of the feed arm portions that is axially adjacent to the second one of the feed arm portions. A fourth one of the flow passages of the manifold is axially closest of the flow passages to the combustor side of the manifold and is axially adjacent to the third one of the flow passages and is in fluid communication with a fourth one of the feed arm portions that is axially closest of the feed arm portions to the combustor side of the manifold and that is axially adjacent to the third one of the feed arm portions. The first feed arm portion is longest of the feed arm portions, wherein the fourth feed arm portion is shortest of the feed arm portions, and wherein the second feed arm portion is longer than the third feed arm portion. The first one of the feed arm portions terminates in two outlets, one on each circumferential side of the feed arm. The fourth one of the feed arm portions terminates in two outlets, one on each circumferential side of the feed arm. Each of the second and third feed arm portions terminates in a single outlet, one on each circumferential side of the feed arm.

In another aspect, a multipoint injection system includes a manifold extending in a circumferential direction wherein a plurality of flow passages are defined through the manifold in the circumferential direction. A plurality of feed arms extend radially inward from the manifold, wherein feed arm portions of the flow passages extend through each of the feed arms. A plurality of injection nozzles are included, wherein each of the feed arm portions of the flow passages includes a respective outlet opening in an axial direction toward the combustor side of the manifold with a respective one of the injection nozzles in fluid communication with each of the outlets. Each injection nozzle includes an air passage therethrough with an air inlet. The feed arms each follow a path that is circumferentially offset from the air inlets so each of the feed arms is clear from a flow path directly upstream in the axial direction of each of the air inlets.

Each of the flow passages has a cross-sectional shape in a radial plane that defines a parallelogram. Each of the feed arm portions defines a cross-sectional shape that tapers in an axial direction extending toward the combustor side of the manifold.

Each of the feed arms follows a path that is oblique relative to a purely radial direction defined by the manifold and to the circumferential direction of the manifold. The outlet openings of each feed arm include outlet openings that are each defined in a respective branch that extends circumferentially from the feed arm, at least one of the branches extending from a first side of the feed arm, and at least one of the branches extending from a second side of the feed arm opposite the first side. The feed arm portions of each feed arm are in fluid communication with respective ones of the injection nozzles on both sides of the feed arm circumferentially.

A method of manufacturing a multipoint injection system includes additively manufacturing a manifold together with a plurality of feed arms as those described above. Additively manufacturing the manifold together with the feed arms includes growing the manifold and feed arms in build direction aligned with the axial direction. The longest one of the feed arm portions of each feed arm is adjacent the compressor side of the manifold, wherein additively manufacturing includes growing the manifold and feed arms in a build direction beginning on the compressor side of the manifold and ending on the combustor side of the manifold.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
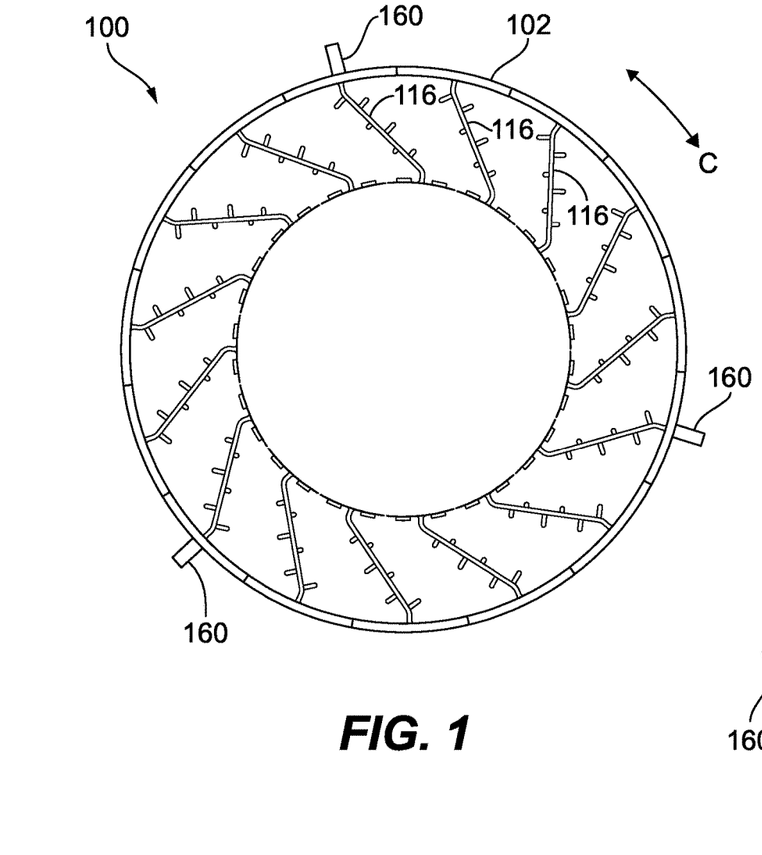
FIG. 1 is a front elevation view of an exemplary embodiment of a system constructed in accordance with the present disclosure, showing the manifold and feed arms viewed from the compressor side.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-10, as will be described. The systems and methods described herein can be used to provide fuel flow to injector nozzles for multipoint injection in gas turbine engines.

The multipoint injection system 100 includes a manifold 102 extending in a circumferential direction C wherein a plurality of flow passages 104, 106, 108, 110 (not shown in FIG. 1, but see FIG. 4) each having a main portion defined through the manifold 102 in the circumferential direction C. The flow passages 104, 106, 108, 110 are in fluid isolation from one another and are spaced apart from one another in an axial direction A along an axial width W (identified in FIGS. 4-5) extending from a compressor side 112, e.g., a first axial end, of the manifold 102 to a combustor side 114, e.g., a second axial sise, of the manifold 102.

Figure 2:
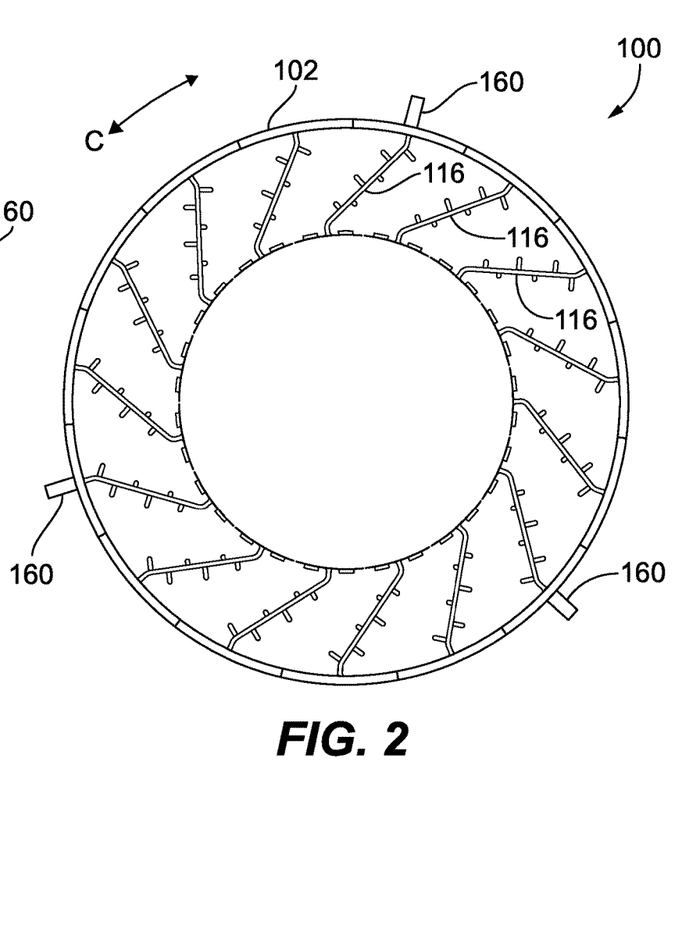
FIG. 2 is a back elevation view of the system of FIG. 1, showing the manifold and feed arms viewed from the combustor side.
Figure 5:
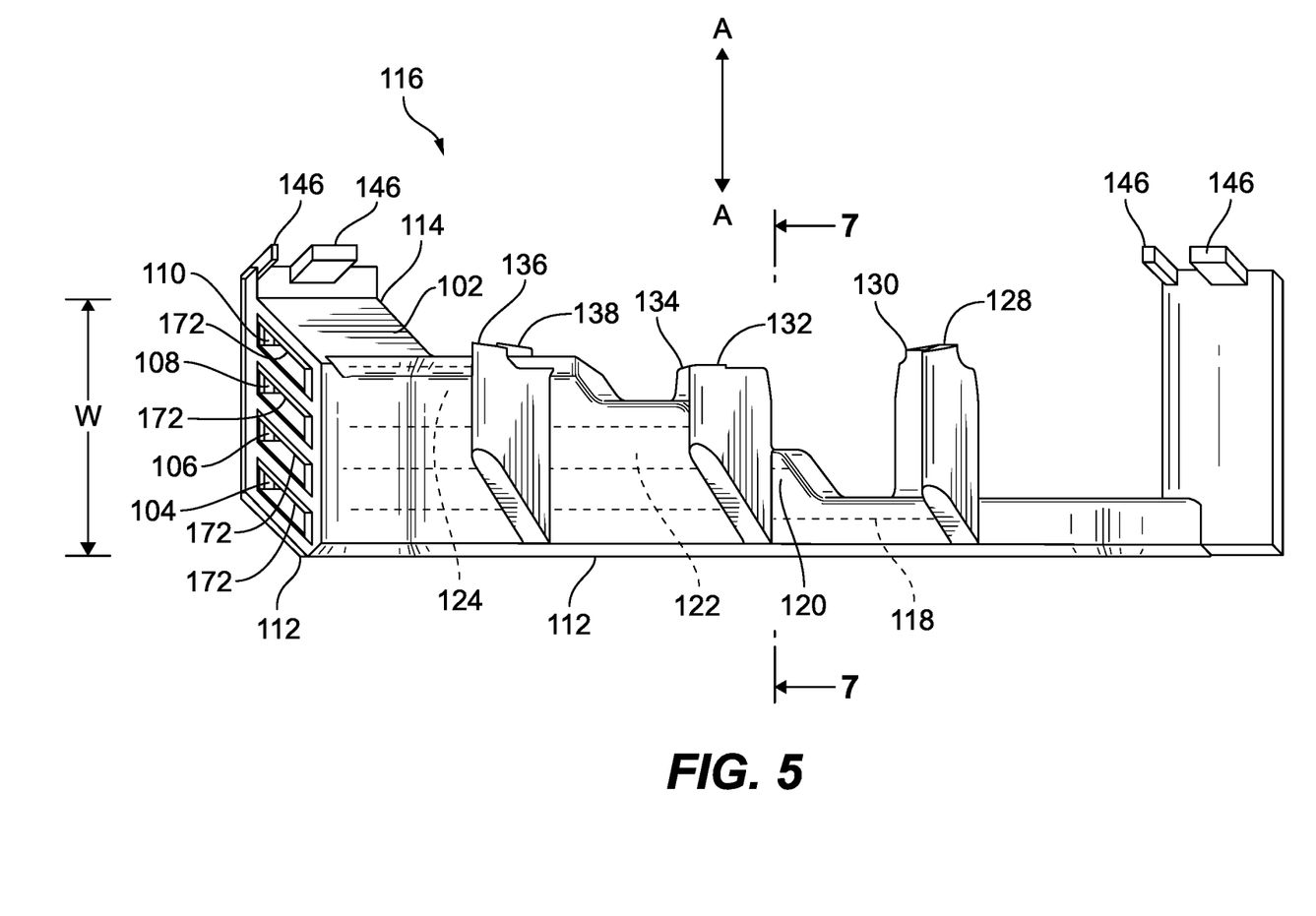
FIG. 5 is a side elevation view of a feed arm of the system of FIG. 1, showing the flow passages in the manifold.
Figure 6:
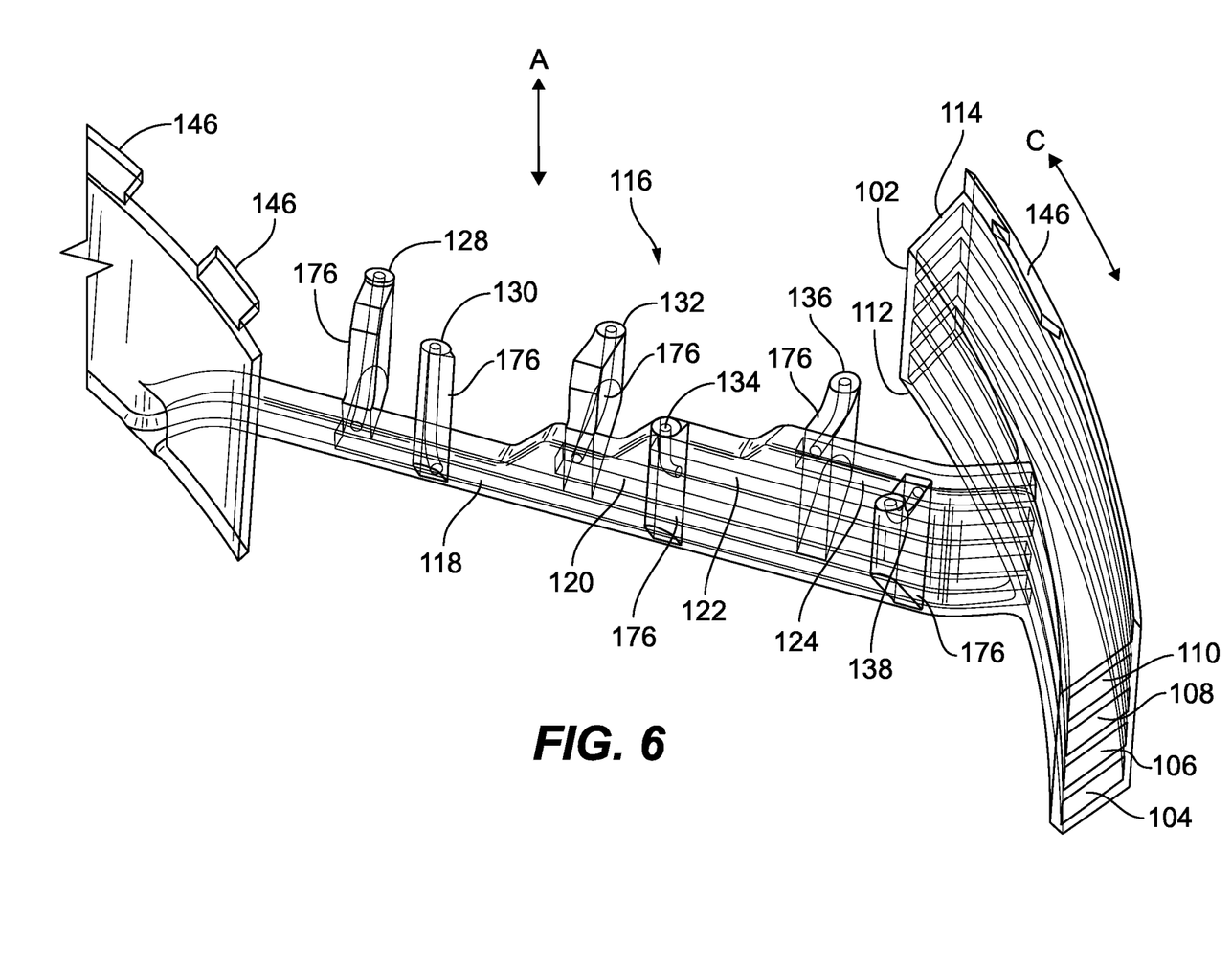
FIG. 6 is a schematic perspective view of the feed arm of FIG. 6, schematically showing the internal manifolding of the flow passages and feed arm portions of the flow passages.
Figure 7:
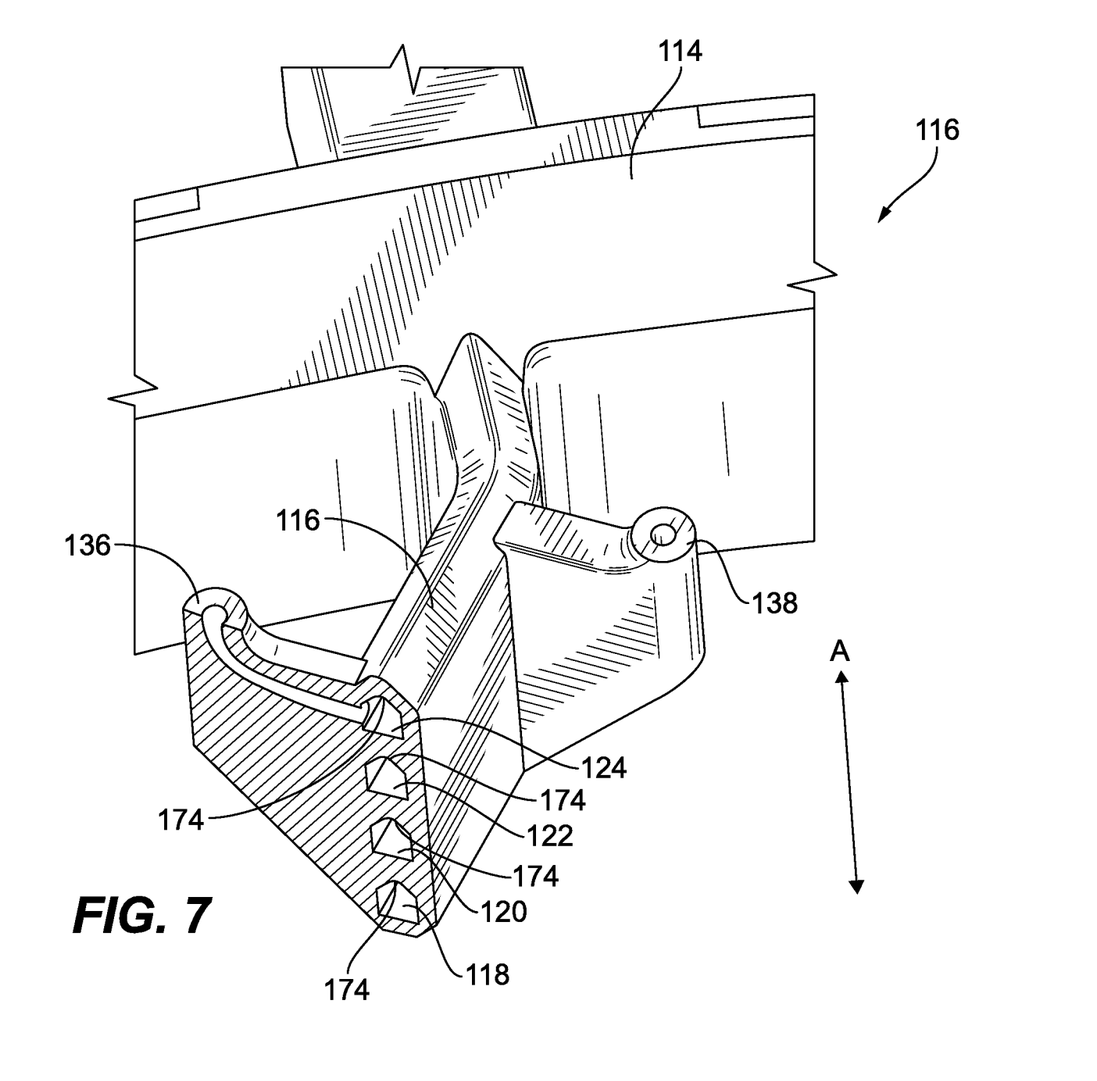
FIG. 7 is a cross-sectional perspective view of the feed arm of FIG. 5, showing the cross-sectional shape of the feed arm portions of the flow passages.
Figure 8:
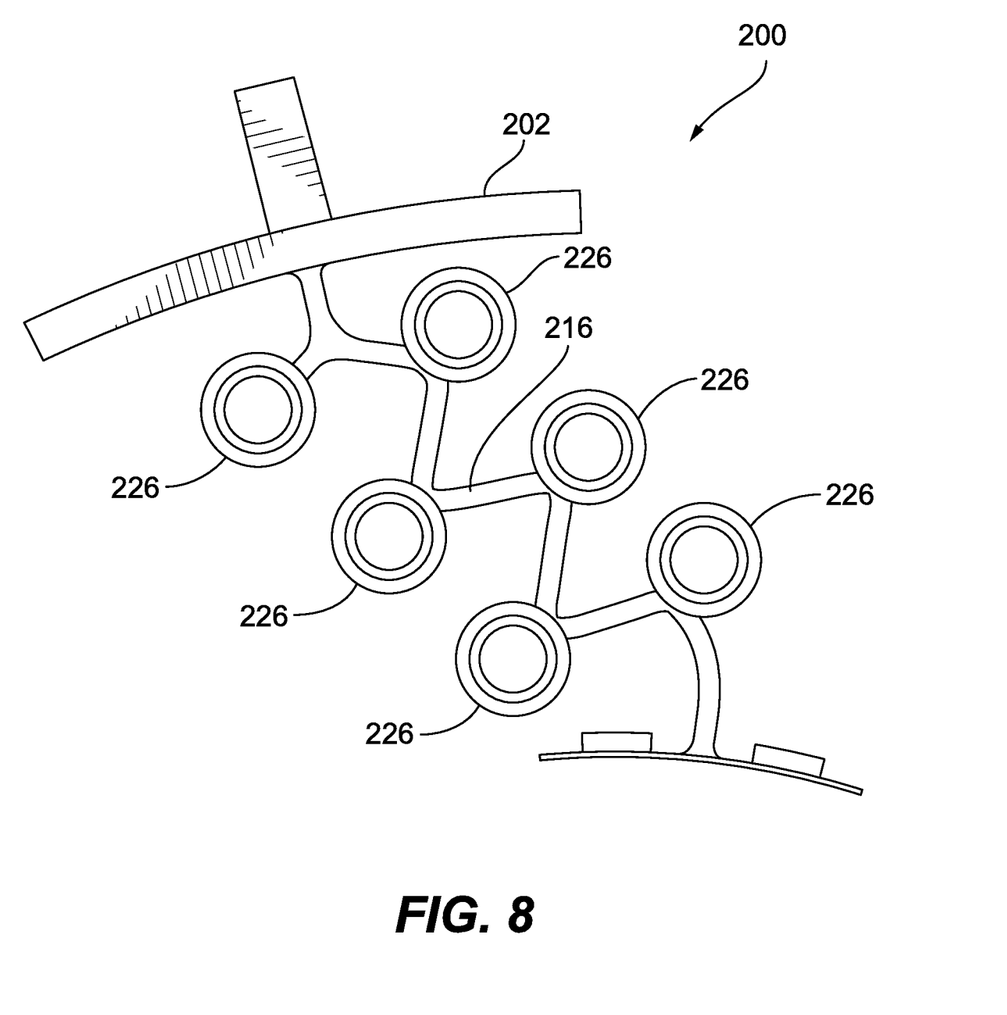
FIG. 8 is a schematic front end elevation view of another exemplary embodiment of a feed arm for the system of FIG. 1, showing a feed arm that follows a non-linear path between the injection nozzles.
Figure 9:
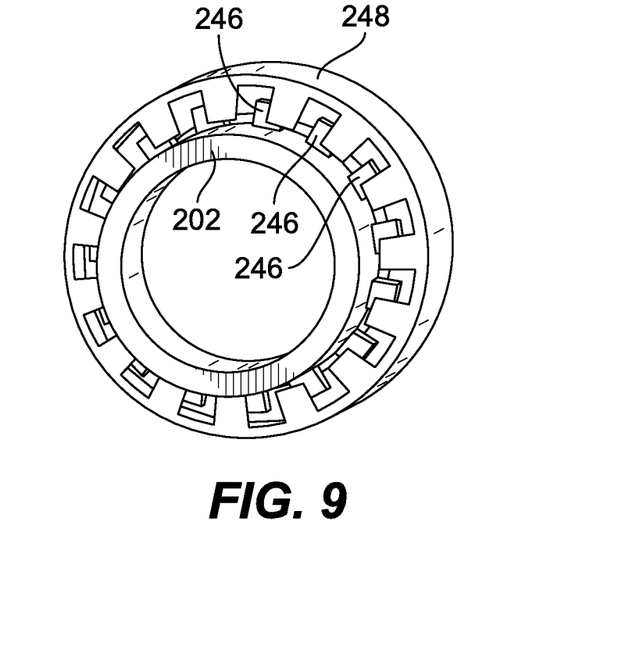
FIG. 9 is a schematic perspective view of another exemplary embodiment of a system similar to that of FIG. 1, but with the bayonet flanges reversed to allow reversal of the build direction.

With reference to FIGS. 1 and 2, a plurality of feed arms 116 extends radially inward from the manifold 102. Feed arm portions 118, 120, 122, 124 of the flow passages 104, 106, 108, 110 (respectively) extend through each of the feed arms 116 as shown in FIGS. 5-7. The feed arm portions 118, 120, 122, 124 of the flow passages 104, 106, 108, 110 are within the axial width W of the manifold 102 as shown in FIG. 5.

Figure 3:
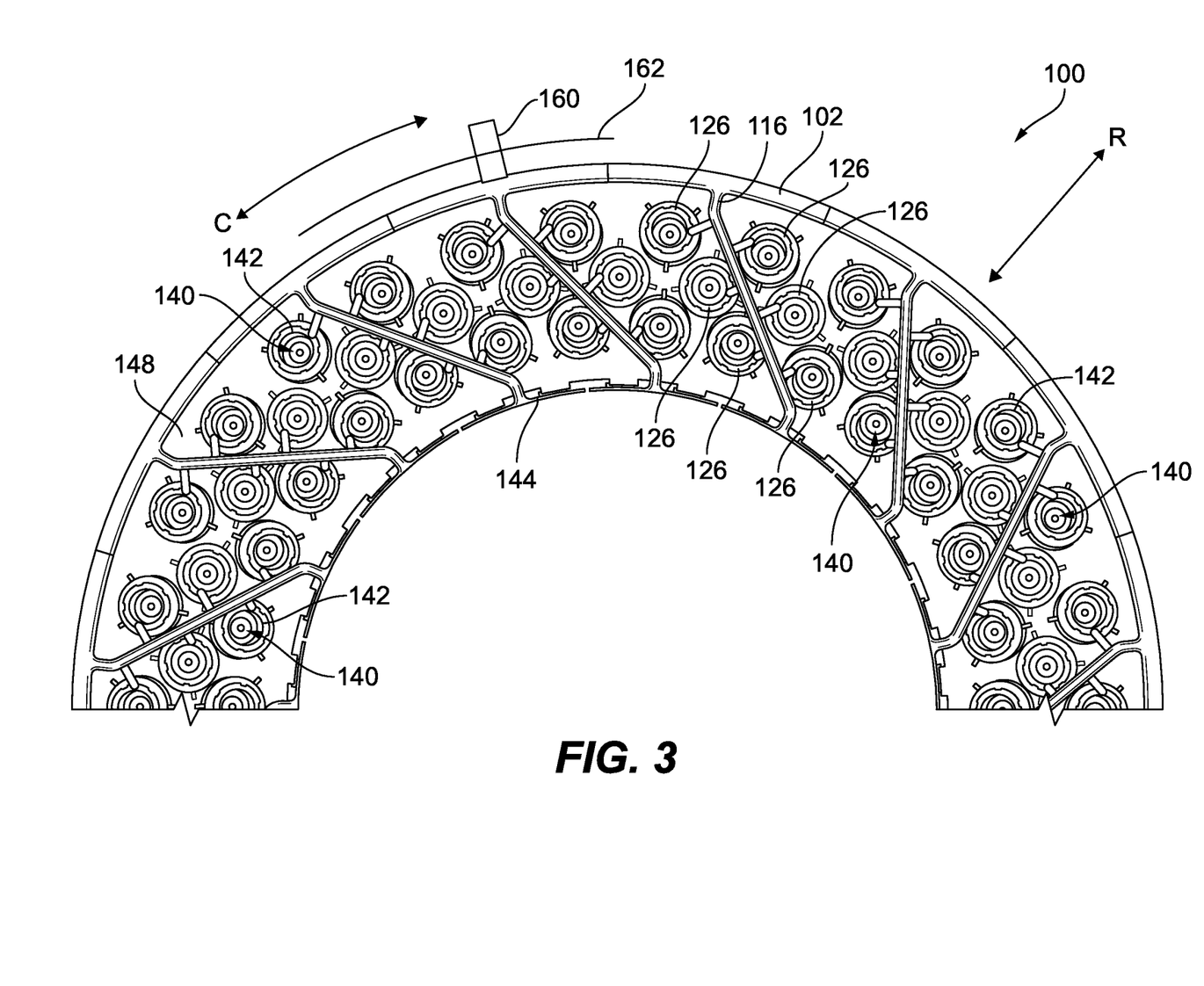
FIG. 3 is a front elevation view of a portion of the system of FIG. 1, showing the system with the combustor dome and injection nozzles.
Figure 4:
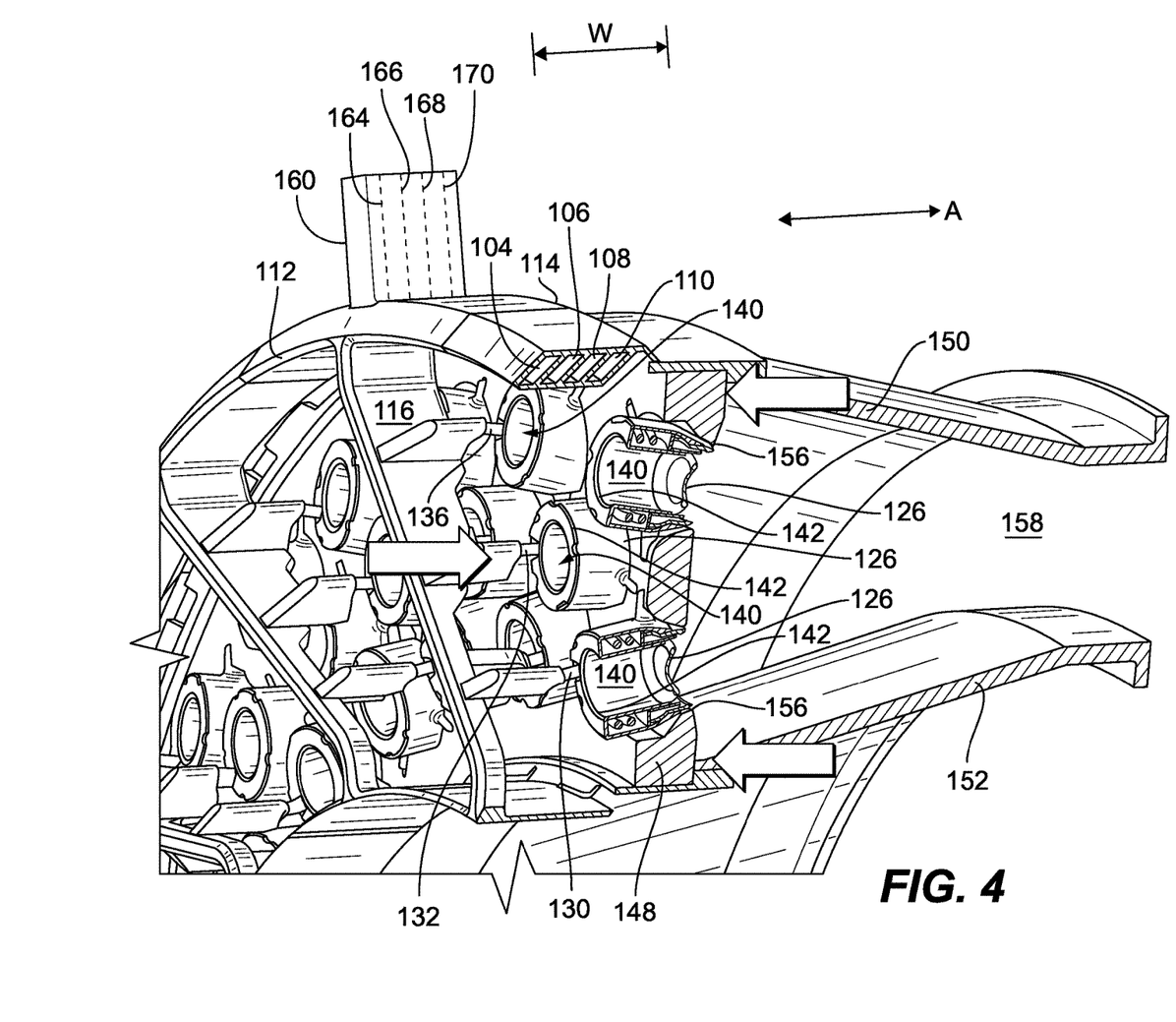
FIG. 4 is a cross-sectional perspective view of the system of FIG. 1, showing the branches of the feed arms connected to the injection nozzles.

With reference now to FIG. 3, a plurality of injection nozzles 126 are included. There are six injection nozzles 126 for each of the fifteen feed arms 116, however those skilled in the art will readily appreciate that any suitable number of feed arms 116 and nozzles 126 can be used without departing from the scope of this disclosure. As shown in FIG. 6, each of the feed arm portions 118, 120, 124, 126 of the flow passages 104, 106, 108, 110 includes a respective outlet opening 128, 132, 134, 136 (respectively) in the axial direction A opening toward the combustor side 114 of the manifold 102. Feed arm portions 118 and 124 each have a second such outlet 130 and 138 (respectively). As shown in FIGS. 3-4, a respective one of the injection nozzles 126 is in fluid communication with each of the outlets 128, 130, 132, 124, 126, 138 of each feed arm 116. The outlets 128, 130, 132, 124, 126, 138 are all within the axial width W of the manifold 102 as shown in FIG. 5.

With reference to FIGS. 3-4, each injection nozzle 126 includes an air passage 140 therethrough with an air inlet 142. The feed arms 116 each follow a path that is circumferentially (in the circumferential direction C) offset from the air inlets 142 so each of the feed arms 116 is clear from a flow path directly upstream in the axial direction A of each of the air inlets 142. This reduces blockage of air flow from an upstream compressor into the air inlets 142 relative to traditional multi-point feed arm arrangements. Each of the feed arms 116 follows a path that is oblique relative to a purely radial direction R defined by the manifold 102 and to the circumferential direction C of the manifold 116. While feed arms 116 are each depicted as following a linear path, those skilled in the art will readily appreciate that other paths are possible for feed arms, such as the serpentine path of feed arm 216 of manifold 202 shown in FIG. 8, which similarly avoids blocking the inlets of the injection nozzles 226 in a system 200 similar in other aspects so system 100 of FIGS. 3-4. Those skilled in the art will readily appreciate that the path followed by the feed arms 116 can be selected, e.g., using computational fluid dynamics (CFD), to minimize aerodynamic losses due to the feed arm 116 for a given multi-point injunction application.

With continued reference to FIGS. 3-4, an inner ring 144 is supported from a radially inward end of the feed arms 116, each feed arm 116 supporting one segment of the inner ring 144. The manifold 102 and the inner ring 144 each include bayonet flanges 146 extending in the axial direction A away from the compressor side 112 of the manifold 102 as shown in FIG. 5. A combustor dome 148 is mounted together with the manifold 102 with the injection nozzles 126 extending though the combustor dome 148. The combustor dome can be made of a ceramic composite material suited or high temperature operation, and can be made in multiple segments for ease of installation. An outer combustor wall 150 is mounted to the manifold 102 and an inner combustor wall 152 is mounted to the manifold 102 radially inward from the outer combustor wall 150. The inner combustor wall 152 is mounted to the inner ring 144. The combustor dome 148, injection nozzles 126, inner combustor wall 152, and outer combustor wall 150 form an enclosure in which a majority of air passing from a compressor side of the combustor dome (i.e. the left side as viewed in FIG. 4) must pass through the injection nozzles 126, including an outer air passage 156 between each injection nozzle 126 and the combustor dome 148, to reach a combustor space 158 defined radially between the inner and outer combustor walls 150 and 152. The large arrows in FIG. 4 indicate the clamping forces from the bayonet flanges 146 and injection nozzles 126 squeezing the combustor dome 148 from both sides to hold the assembly of the system 100 together.

With continued reference to FIGS. 3-4, three mounting flanges 160 (all of which are shown in FIGS. 1-2) extends radially outward from the manifold 102 for supporting the manifold 102 in an engine case 162 of a gas turbine engine, e.g. a high pressure engine case, a portion of which is schematically indicated in FIG. 3. At least one mounting flange 160 includes supply passages 164, 166, 168, 170 defined therethrough, in fluid communication with a respective one of the flow passages 104, 106, 108, 110 of the manifold 102 for supplying fuel from an external source through the manifold 102 to the injection nozzles 126. The manifold 102 as shown in FIGS. 1-2 forms a complete ring, with the flow passages 104, 106, 108, 110 each forming a complete ring. However, it is also contemplated that the manifold 102 can form a segment of a complete ring configured to form a complete ring with at least one additional manifold 102, i.e., the system 100 can included multiple segmented manifolds 102 to form a complete manifold ring and ring of injection nozzles 126. Each segment needs a respective set of supply passages such as supply passages 164, 166, 168, and 170. The system 100 provides a multichannel fuel distribution system entirely within the engine, i.e., within the high pressure engine case 162. The location of this internal fuel manifold is advantageous as opposed to conventional systems where the manifold is located outside the engine and requires numerous holes in the high pressure casing.

Referring now to FIG. 6, the following discusses the positions on the flow passages 104, 106, 108, 110 and the feed arm portions 118, 120, 122, 124. The flow passage 104 of the manifold 102 is axially closest of the flow passages 104, 106, 108, 110 to the compressor side 112 of the manifold 102 and is in fluid communication with the feed arm portion 118 that is axially closest of the feed arm portions 118, 120, 122, 124 to the compressor side 112 of the manifold 102. The flow passage 106 of the manifold 102 is axially adjacent to the flow passage 104 and is in fluid communication with the feed arm portion 120 that is axially adjacent to the feed arm portion 118. The flow passage 108 of the manifold 102 is axially adjacent to the flow passage 106 and is in fluid communication with the feed arm portion 122 that is axially adjacent to the feed arm portion 120. The flow passage 110 of the manifold 102 is axially closest of the flow passages 104, 106, 108, 110 to the combustor side 114 of the manifold 102 and is axially adjacent to the flow passage 108 and is in fluid communication with the feed arm portion 124 that is axially closest of the feed arm portions 118, 120, 122, 124 to the combustor side 114 of the manifold 102 and that is axially adjacent to the feed arm portion 122.

The first feed arm portion 118 is longest of the feed arm portions 118, 120, 122, 124, and the arm portion 124 is shortest. The feed arm portion 120 is longer than the feed arm portion 122. The feed arm portion 118 terminates in two outlets 128 and 130, one on each circumferential side of the feed arm 116, which can be staged together during engine operation. The feed arm portion 124 also terminates in two outlets 136, 138, one on each circumferential side of the feed arm 116 for staging the two outlets 136 and 138 together during engine operation. Each of the feed arm portions 120 and 122 terminates in a single respective outlet 132 and 134, one on each circumferential side of the feed arm 116, which can be staged separately from one another during engine operation. There are a total of four possible independent stages for issuing fuel nozzles 126, namely one stage from each flow passage 104, 106, 108, and 110. Those skilled in the art will readily appreciate that any other suitable number of stages can be used without departing from the scope of this disclosure.

With reference to FIG. 6, the outlet openings 128, 130, 132, 134, 136, 138 are each defined in a respective branch 176 that extends circumferentially from the feed arm 116, three of the branches 176 extending from a first side of the feed arm 116, and three of the branches 176 extending from a second side of the feed arm 116 opposite the first side. As shown in FIGS. 3-4, the feed arm portions 118, 120, 122, 124 of each feed arm 116 are in fluid communication with respective ones of the injection nozzles 126 on both sides of the feed arm 116 circumferentially for a total of six injections nozzles 126 feed from each feed arm 116. Supporting injection nozzles 126 from both sides of each feed arm 116 reduces the number of feed arms required and provides the associated weight savings over multi-point configurations where nozzles are only supported from one side of a feed arm.

With reference now to FIGS. 5-7, each of the flow passages 104, 106, 108, 110 has a cross-sectional shape in a radial plane that defines a parallelogram. As oriented in FIG. 5, the upper interior surface 172 is oblique to the axial direction. As shown in FIG. 7, each of the feed arm portions 118, 120, 122, 124 defines a cross-sectional shape that tapers in an axial direction A extending toward the combustor 114 side of the manifold and rises to a peak 174. These cross-sectional shapes reduce overhang surfaces, facilitating additive manufacturing processes for fabricating manifold 102. The bayonet flanges 146 are also oriented oblique relative to the build direction for similar reasons.

Figure 10:
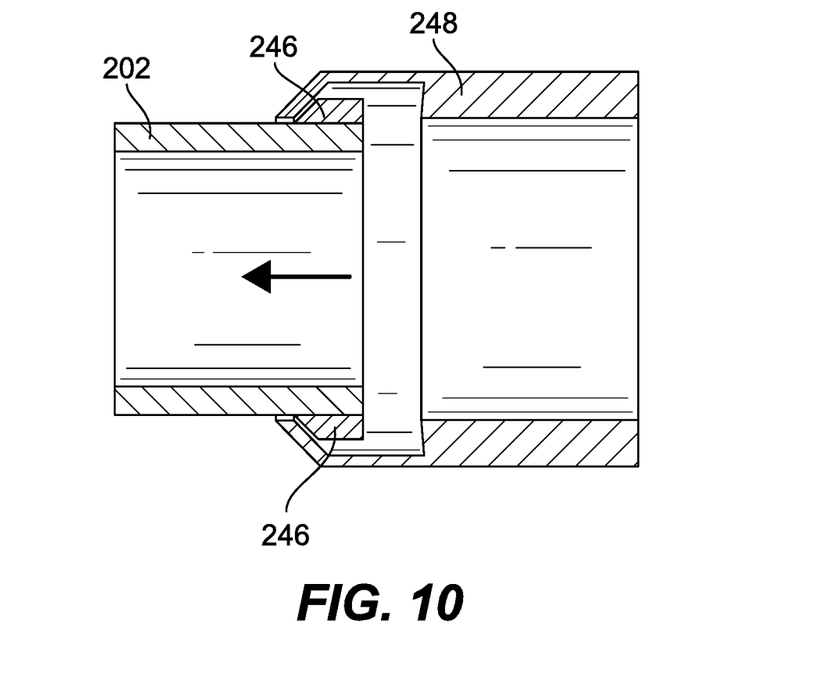
FIG. 10 is a schematic cross-sectional side elevation view of the system of FIG. 9, showing the reversed build direction.

With reference now to FIG. 5, a method of manufacturing a multipoint injection system, e.g., system 100, includes additively manufacturing a manifold, e.g., manifold 102, together with a plurality of feed arms, e.g., feed arms 116, as those described above. Additively manufacturing the manifold together with the feed arms includes growing the manifold and feed arms in build direction aligned with the axial direction, e.g., axial direction A in FIG. 5. The longest one of the feed arm portions, e.g., feed arm portion 118, of each feed arm is adjacent the compressor side of the manifold, wherein additively manufacturing includes growing the manifold and feed arms in a build direction beginning on the compressor side of the manifold and ending on the combustor side of the manifold (i.e., starting at the bottom as oriented in FIG. 5 and building upward toward the top as oriented in FIG. 5). Having all of the passages 104, 106, 108, 110 and feed arm portions 118, 120, 122, 124 within the width W of the manifold 102 reduces the build height for additive manufacturing the manifold and feed arm portions of the system 100 relative to traditional multi-point configurations, which reduces additive manufacturing time and errors. Those skilled in the art will readily appreciate that the build direction shown in FIG. 5 can be reversed, e.g., by reversing the direction of the outlets (e.g. outlets 128, 130, 132, 124, 126, 138 of FIG. 5) and modifying the bayonet structures as shown schematically in FIG. 9, where a schematic manifold 202 is shown with reversed bayonet flanges 246 engaged to an combustor dome 248. The build direction for manifold 202 is indicated in FIG. 10 with the large arrow.

The methods and systems of the present disclosure, as described above and shown in the drawings, provide for multipoint injection with superior properties including reduced blockage of compressor air, reduced weight, and improved manufacturability through additive processes. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A multipoint injection system comprising:
   a manifold extending in a circumferential direction wherein a plurality of flow passages each having a main portion defined through the manifold in the circumferential direction;
   a plurality of feed arms extending radially inward from the manifold, wherein feed arm portions of the plurality of flow passages extend through each of the plurality of feed arms;
   wherein each of the feed arms follows a path that is oblique relative to a purely radial direction defined by the manifold and to the circumferential direction of the manifold; and
   a plurality of injection nozzles, wherein each of the feed arm portions of the plurality of flow passages includes a respective outlet opening in an axial direction toward a combustor side of the manifold with a respective one of the plurality of injection nozzles in fluid communication with each of the outlets, wherein each of the plurality of injection nozzle includes an air passage therethrough with an air inlet, and wherein the plurality of feed arms each follow a path that is circumferentially offset from the plurality of injection nozzles so each of the plurality of feed arms is clear from a flow path directly upstream in the axial direction of each of the plurality of injection nozzles.

2. The system as recited in claim 1, wherein the outlet openings of each feed arm include outlet openings that are each defined in a respective branch that extends circumferentially from the feed arm, at least one of the branches extending from a first side of the feed arm, and at least one of the branches extending from a second side of the feed arm opposite the first side.

3. The system as recited in claim 1, wherein the feed arm portions of each feed arm are in fluid communication with respective ones of the injection nozzles on both sides of the feed arm circumferentially.

4. The system as recited in claim 1, wherein the flow passages are in fluid isolation from one another and are spaced apart from one another in an axial direction along an axial width extending from a compressor side of the manifold to a combustor side of the manifold, and wherein the feed arm portions of the flow passages are within the axial width of the manifold.

5. The system as recited in claim 1, wherein a first one of the flow passages of the manifold is axially closest of the flow passages to a compressor side of the manifold and is in fluid communication with a first one of the feed arm portions that is axially closest of the feed arm portions to a compressor side of the manifold,
   wherein a second one of the flow passages of the manifold is axially adjacent to the first one of the flow passages and is in fluid communication with a second one of the feed arm portions that is axially adjacent to the first one of the feed arm portions,
   wherein a third one of the flow passages of the manifold is axially adjacent to the second one of the flow passages and is in fluid communication with a third one of the feed arm portions that is axially adjacent to the second one of the feed arm portions, and
   wherein a fourth one of the flow passages of the manifold is axially closest of the flow passages to the combustor side of the manifold and is axially adjacent to the third one of the flow passages and is in fluid communication with a fourth one of the feed arm portions that is axially closest of the feed arm portions to the combustor side of the manifold and that is axially adjacent to the third one of the feed arm portions.

6. The system as recited in claim 5, wherein the first feed arm portion is longest of the feed arm portions, wherein the fourth feed arm portion is shortest of the feed arm portions, and wherein the second feed arm portion is longer than the third feed arm portion.

7. The system as recited in claim 5, wherein the first one of the feed arm portions terminates in two outlets, one on each circumferential side of the feed arm.

8. The system as recited in claim 5, wherein the fourth one of the feed arm portions terminates in two outlets, one on each circumferential side of the feed arm.

9. The system as recited in claim 5, wherein each of the second and third feed arm portions terminates in a single outlet, one on each circumferential side of the feed arm.

10. The system as recited in claim 1, further comprising at least one mounting flange extending radially outward from the manifold for supporting the manifold in an engine case.

11. The system as recited in claim 10, wherein the at least one mounting flange includes at least one mounting flange with supply passages defined therethrough, one of the supply passages being in fluid communication with a respective one of the flow passages of the manifold.

12. The system as recited in claim 1, wherein the manifold forms a complete ring, with the flow passages each forming a complete ring.

13. The system as recited in claim 1, wherein the manifold forms a segment of a complete ring configured to form a complete ring with at least one additional manifold.

14. The system as recited in claim 1, further comprising an inner ring supported from a radially inward end of the feed arms.

15. The system as recited in claim 1, further comprising:
a combustor dome mounted together with the manifold with the injection nozzles extending though the combustor dome;
an outer combustor wall mounted to the manifold; and
an inner combustor wall radially inward from the outer combustor wall, the inner combustor wall mounted to an inner ring supported from radially inward ends of the feed arms, wherein the combustor dome, injection nozzles, inner combustor wall, and outer combustor wall form an enclosure in which a majority of air passing from a compressor side of the combustor dome must pass through the injection nozzles to reach a combustor space defined radially between the inner and outer combustor walls.

16. A multipoint injection system comprising:
a manifold extending in a circumferential direction wherein a plurality of flow passages each having a main portion defined through the manifold in the circumferential direction;
a plurality of feed arms extending radially inward from the manifold, wherein feed arm portions of the flow passages extend through each of the feed arms;
a plurality of injection nozzles, wherein each of the feed arm portions of the flow passages includes a respective outlet opening in an axial direction toward a combustor side of the manifold with a respective one of the injection nozzles in fluid communication with each of the outlets, wherein each of the injection nozzles includes an air passage therethrough with an air inlet, and wherein the feed arms each follow a path that is circumferentially offset from the air inlets so each of the feed arms is clear from a flow path directly upstream in the axial direction of each of the air inlets; and
an inner ring supported from a radially inward end of the feed arms,
wherein the manifold and the inner ring each include bayonet flanges extending in the axial direction away from a compressor side of the manifold.

17. A multipoint injection system comprising:
a manifold extending in a circumferential direction wherein a plurality of flow passages each having a main portion defined through the manifold in the circumferential direction;
a plurality of feed arms extending radially inward from the manifold, wherein feed arm portions of the flow passages extend through each of the feed arms; and
a plurality of injection nozzles, wherein each of the feed arm portions of the flow passages includes a respective outlet opening in an axial direction toward a combustor side of the manifold with a respective one of the injection nozzles in fluid communication with each of the outlets, wherein each injection nozzle includes an air passage therethrough with an air inlet, and wherein the feed arms each follow a path that is circumferentially offset from the air inlets so each of the feed arms is clear from a flow path directly upstream in the axial direction of each of the air inlets, wherein each of the flow passages has a cross-sectional shape in a radial plane that defines a parallelogram.

18. A multipoint injection system comprising:
a manifold extending in a circumferential direction wherein a plurality of flow passages each having a main portion defined through the manifold in the circumferential direction;
a plurality of feed arms extending radially inward from the manifold, wherein feed arm portions of the flow passages extend through each of the feed arms; and
a plurality of injection nozzles, wherein each of the feed arm portions of the flow passages includes a respective outlet opening in an axial direction toward a combustor side of the manifold with a respective one of the injection nozzles in fluid communication with each of the outlets, wherein each of the injection nozzles includes an air passage therethrough with an air inlet, and wherein the feed arms each follow a path that is circumferentially offset from the air inlets so each of the feed arms is clear from a flow path directly upstream in the axial direction of each of the air inlets,
wherein each of the feed arm portions defines a cross-sectional shape that tapers in the axial direction extending toward the combustor side of the manifold.

* * * * *